(12) United States Patent
Williams et al.

(10) Patent No.: US 11,055,419 B2
(45) Date of Patent: Jul. 6, 2021

(54) DECENTRALIZED DATA AUTHENTICATION SYSTEM FOR CREATION OF INTEGRATED LIFETIME HEALTH RECORDS

(71) Applicant: Alan Health and Science, Wallingford, PA (US)

(72) Inventors: Christopher Williams, Wallingford, PA (US); Joseph A. Fiscella, Hoboken, NJ (US); Anita M. Williams Galiano, Pennington, NJ (US)

(73) Assignee: Alan Health and Science, Wallingford, PA (US)

( * ) Notice: Subject to any disclaimer, the term of this patent is extended or adjusted under 35 U.S.C. 154(b) by 289 days.

(21) Appl. No.: 16/202,223

(22) Filed: Nov. 28, 2018

(65) Prior Publication Data

US 2019/0213333 A1    Jul. 11, 2019

Related U.S. Application Data

(60) Provisional application No. 62/593,559, filed on Dec. 1, 2017.

(51) Int. Cl.
*G06F 21/60* (2013.01)
*H04L 9/06* (2006.01)
*H04L 9/32* (2006.01)
*H04L 9/30* (2006.01)
(Continued)

(52) U.S. Cl.
CPC ........ *G06F 21/602* (2013.01); *G06F 21/6245* (2013.01); *G06F 21/64* (2013.01); *H04L 9/0637* (2013.01); *H04L 9/30* (2013.01); *H04L 9/3239* (2013.01); *H04L 9/3242* (2013.01); *H04L 9/3247* (2013.01); *H04L 9/3263* (2013.01); *H04L 9/3268* (2013.01);
(Continued)

(58) Field of Classification Search
CPC .... G06F 21/602; G06F 21/6245; G06F 21/64; H04L 9/0637; H04L 9/30; H04L 9/3239; H04L 9/3242; H04L 9/3247; H04L 9/3263; H04L 9/3268; H04L 9/3297; H04L 2209/38; H04L 2209/88; G16H 10/60; G16H 50/20
USPC ....................................................... 713/193
See application file for complete search history.

(56) References Cited

U.S. PATENT DOCUMENTS 10,102,526 B1 * 10/2018 Madisetti ............. G06Q 20/389
2003/0140223 A1 * 7/2003 Desideri .................. H04L 63/20
713/153

(Continued)

*Primary Examiner* — Shahriar Zarrineh
(74) *Attorney, Agent, or Firm* — Culhane Meadows, PLLC

(57) ABSTRACT

A decentralized data authentication system integrates blockchain technologies, independent verification software, a decentralized certificate authority system implemented in the cloud, and a centralized redundant database system that together form data portability systems and data longevity systems that enable the creation of integrated lifetime health records that can be accessed by the patient, provider, and payer using public/private keys. Data portability is provided through creation of a decentralized certificate authority system that allows users to sign and later verify data that has been offline. The decentralized certificate authority system also enables tracking of data and timestamping of data via a neutral timestamping mechanism, such as the blockchain, that cannot be altered.

19 Claims, 11 Drawing Sheets

(51) Int. Cl.
*G06F 21/62* (2013.01)
*G06F 21/64* (2013.01)

(52) U.S. Cl.
CPC ........ *H04L 9/3297* (2013.01); *H04L 2209/38* (2013.01); *H04L 2209/88* (2013.01)

(56) References Cited

U.S. PATENT DOCUMENTS

| | | | |
|---|---|---|---|
| 2010/0031140 A1* | 2/2010 | Cummins | H04L 9/3247 715/236 |
| 2015/0332283 A1* | 11/2015 | Witchey | H04W 12/02 705/3 |
| 2016/0110261 A1* | 4/2016 | Parab | G06F 11/1453 707/692 |
| 2016/0162897 A1* | 6/2016 | Feeney | G06Q 20/065 705/71 |
| 2017/0075941 A1* | 3/2017 | Finlow-Bates | H04L 9/3239 |
| 2017/0085555 A1* | 3/2017 | Bisikalo | H04L 9/3236 |
| 2017/0091397 A1* | 3/2017 | Shah | G06Q 50/01 |
| 2017/0126702 A1* | 5/2017 | Krishnamurthy | H04L 63/123 |
| 2017/0161439 A1* | 6/2017 | Raduchel | H04W 12/06 |
| 2017/0300627 A1* | 10/2017 | Giordano | G06F 21/6245 |
| 2017/0317997 A1* | 11/2017 | Smith | H04L 9/3247 |
| 2017/0346693 A1* | 11/2017 | Dix | H04L 9/3239 |
| 2018/0001184 A1* | 1/2018 | Tran | G06F 1/163 |
| 2018/0060496 A1* | 3/2018 | Bulleit | H04L 9/3239 |
| 2018/0082024 A1* | 3/2018 | Curbera | G06F 21/00 |
| 2018/0109516 A1* | 4/2018 | Song | H04L 9/3268 |
| 2018/0114045 A1* | 4/2018 | Ebrahimi | G06K 7/1417 |
| 2018/0183771 A1* | 6/2018 | Campagna | H04L 63/061 |
| 2018/0227293 A1* | 8/2018 | Uhr | H04L 9/3263 |
| 2018/0253464 A1* | 9/2018 | Kohli | G06F 16/219 |
| 2019/0005470 A1* | 1/2019 | Uhr | H04L 9/3239 |
| 2019/0140819 A1* | 5/2019 | Dolev | H04L 63/0442 |
| 2019/0165943 A1* | 5/2019 | Chari | H04L 9/3221 |
| 2019/0189254 A1* | 6/2019 | Roennow | A61B 5/6813 |
| 2019/0245699 A1* | 8/2019 | Irwan | H04L 9/3268 |
| 2020/0234386 A1* | 7/2020 | Blackman | H04L 9/0894 |

\* cited by examiner

DECENTRALIZED DATA AUTHENTICATION SYSTEM FOR CREATION OF INTEGRATED LIFETIME HEALTH RECORDS

CROSS-REFERENCE TO RELATED APPLICATIONS

The present application claims priority to U.S. Provisional Patent Application No. 62/593,559, filed Dec. 1, 2017. The contents of that application are incorporated herein by reference.

TECHNICAL FIELD

The application is directed to a decentralized data authentication system for the creation of integrated lifetime health records and, more particularly, to a decentralized data authentication system that integrates blockchain technologies, independent verification software, a decentralized certificate authority system implemented in the cloud, and a centralized redundant database system that together form data portability systems and data longevity systems that enable the creation of integrated lifetime health records that can be accessed by the patient, provider, and payer using public/private keys.

BACKGROUND

Since the advent of electronic medical records, it has been desired to create health records for a patient that span the lifetime of the patient and provide a complete medical history for that patient. However, because of the numerous people that must access the patient's medical records over the course of his or her lifetime, it has been virtually impossible to design such a system that provides the needed access by medical professionals while also complying with the privacy laws, such as HIPAA.

In recent years, there have been several attempts to create an electronic medical history for a patient. However, each approach has significant limitations.

For example, US 2015/0332283 entitled "Healthcare Transaction Validation Via Blockchain Proof-Of-Work, Systems and Methods" purports to provide healthcare transaction validation systems and methods whereby healthcare transactions associated with a stakeholder are compiled into a chain of healthcare transaction blocks, where the chain can be considered a chronicle of a person's healthcare path through life. When a transaction is conducted, the corresponding healthcare parameters (e.g., inputs, outputs, clinical evidence, outcomes, etc.) are sent to one or more validation devices that establish a validity of the transaction and generate a new block via a proof-of-work principle. Once the new block has been calculated, it can be appended to the stakeholder's health care blockchain. However, such systems and methods do not make use of the most stable blockchains with the highest network effect or allow for independent verification of data as well as portability of data. Also, such a system has a 1-to-1 relationship between transaction and records and thus does not enable the degree of scaling necessary to implement a usable system.

In US 2016/0110261, entitled "Cloud Storage Using Merkle Trees," cloud storage systems, methods, and media are described for implementing the steps of storing a data stream on a client side de-duplicating block store of a client device, generating a data stream Merkle tree of the data stream, storing a secure hash algorithm (SHA) key for the data stream Merkle tree, as well as the data stream Merkle tree on the client side de-duplicating block store, recursively iterating through the data stream Merkle tree using an index of a snapshot Merkle tree of the client device that is stored on a cloud data center to determine missing Merkle nodes or missing data blocks which are present in the data stream Merkle tree but not present in the snapshot Merkle tree stored on the cloud data center, and transmitting over a wide area network (WAN) the missing data blocks to the cloud data center. However, such systems and methods do not provide each piece of data on the system an owner and a clear indication of purpose. Rather, the described cloud storage provides a protocol for storing any raw data using only a Merkle tree data structure stored in the cloud for communicating with client devices. The disclosed methods do not verify cryptographic digital signatures and do not enable one to verify pieces of data. A more granular approach is desired that makes use of many more algorithms to enable the stored data to be verified no matter its source.

In US 2017/0039330 entitled "System and Method for Decentralized Autonomous Healthcare Economy Platform," a system and method aggregates all of the healthcare data into a global graph-theoretic topology and processes the data via a hybrid federated and peer-to-peer distributed processing architecture. In the disclosed system, each health blockchain network component is capable of performing a healthcare transaction using a healthcare transaction protocol and side chaining between a buyer and a seller by accessing one or more of a plurality of health data sources. However, the disclosed system is an entirely peer-to-peer system that cannot encompass a vast distributed proprietary healthcare network. Also, the disclosed side-chain protocol does not permit any data to be stored to the blockchain or permit a lifetime medical record for each patient and user to be implemented on the network.

Systems and methods remain desirable that address the above-mentioned and other technical shortcomings in the prior art that have prohibited the development of integrated lifetime health records that can be accessed by the patient, provider, and payer without compromising the integrity of the stored data. The system and methods disclosed herein address these and other limitations of the prior art.

SUMMARY

The systems and methods described herein addresses the needs in the art by relying on multiple platforms that form a cohesive cloud based coordinated system integrating continuous real-time social, mobile, analytical and integration of health care information from any source. The system includes a decentralized data authentication system that is powered by the latest encryption standards and offers data security, data integrity, data portability, and data longevity features that allow an "integrated lifetime health record" to be created that can be accessed by the patient, provider and payer. The disclosed decentralized data authentication system solves problems related to stranded and missing data by introducing data portability and data longevity systems.

In some embodiments, the systems and methods disclosed herein enable data portability through creation of a decentralized certificate authority system that allows users to sign and later verify data that has been offline. The decentralized certificate authority system also enables tracking of data and timestamping of data via a neutral timestamping mechanism, such as the blockchain, that cannot be altered. Combinations of these features in accordance with the claimed systems and methods provide a huge improvement over existing technologies such as those mentioned above and allows users to fill in a completed medical history for each patient over his or her lifetime to form an integrated lifetime health record.

In other embodiments, a Health Management System and Life-Time medical record system is described that leverages the features of a decentralized data authentication system to provide the ultimate in data-security and data connectivity driven by a Merkle tree engine and decentralized certificate authority. The disclosed embodiments also allow users of the system to use keys to recover data and may be bundled with legacy systems to enable the disclosed features.

Embodiments of the system include a decentralized data authentication system comprising a decentralized certificate authority, a Merkle tree engine, and a data connectivity cloud. The decentralized certificate authority includes a certificate verification engine that takes a Merkle branch, record data, and users' keys as input and generates a hash of the record data, signs the hashed data using the users' keys to form signature data, and provides a validity response for the record data. The Merkle tree engine includes a blockchain OP_RETURN writer/reader that hashes the signature data and stores the hashed signature data in a Merkle tree of a blockchain and stores a Merkle root in the blockchain using an OP_RETURN opcode. The data connectivity cloud encrypts and stores the signature data and Merkle tree created from the record data redundantly in decentralized data storage. In some embodiments, the blockchain timestamps the hashed signature data stored to the Merkle tree and the Merkle root and timestamps the Merkle root. In some embodiments, the blockchain comprises a lifetime health record of health data of a patient that is accessed and updated using the patient's public key and a physician's public key. The Merkle tree engine may also include independent verification software that verifies that a user's Merkle branch for the user's records matches the Merkle root in the blockchain. In some embodiments, the independent verification software receives the user's Merkle branch, the user's record data, and the user's keys as input and generates a validity response indicating whether or not a verification test is passed using hash checksums and digital signature algorithms. In use, the decentralized certificate authority accepts record data, signature data, and a user's public key as input, computes the validity of a signature of the signature data, and returns the validity response indicating whether the record data may be imported into the system and stored in the decentralized data storage. In some embodiments, the decentralized certificate authority enables users to sign and later verify authenticity of a record that has been offline by checking a digital signature of the record against the record data stored in the decentralized data storage.

BRIEF DESCRIPTION OF THE DRAWINGS

The present disclosure is illustrated by way of example and not limitation in the figures of the accompanying drawings, in which like references indicate similar elements and in which.

DESCRIPTION

The following description with respect to FIGS. 1-11 sufficiently illustrates specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
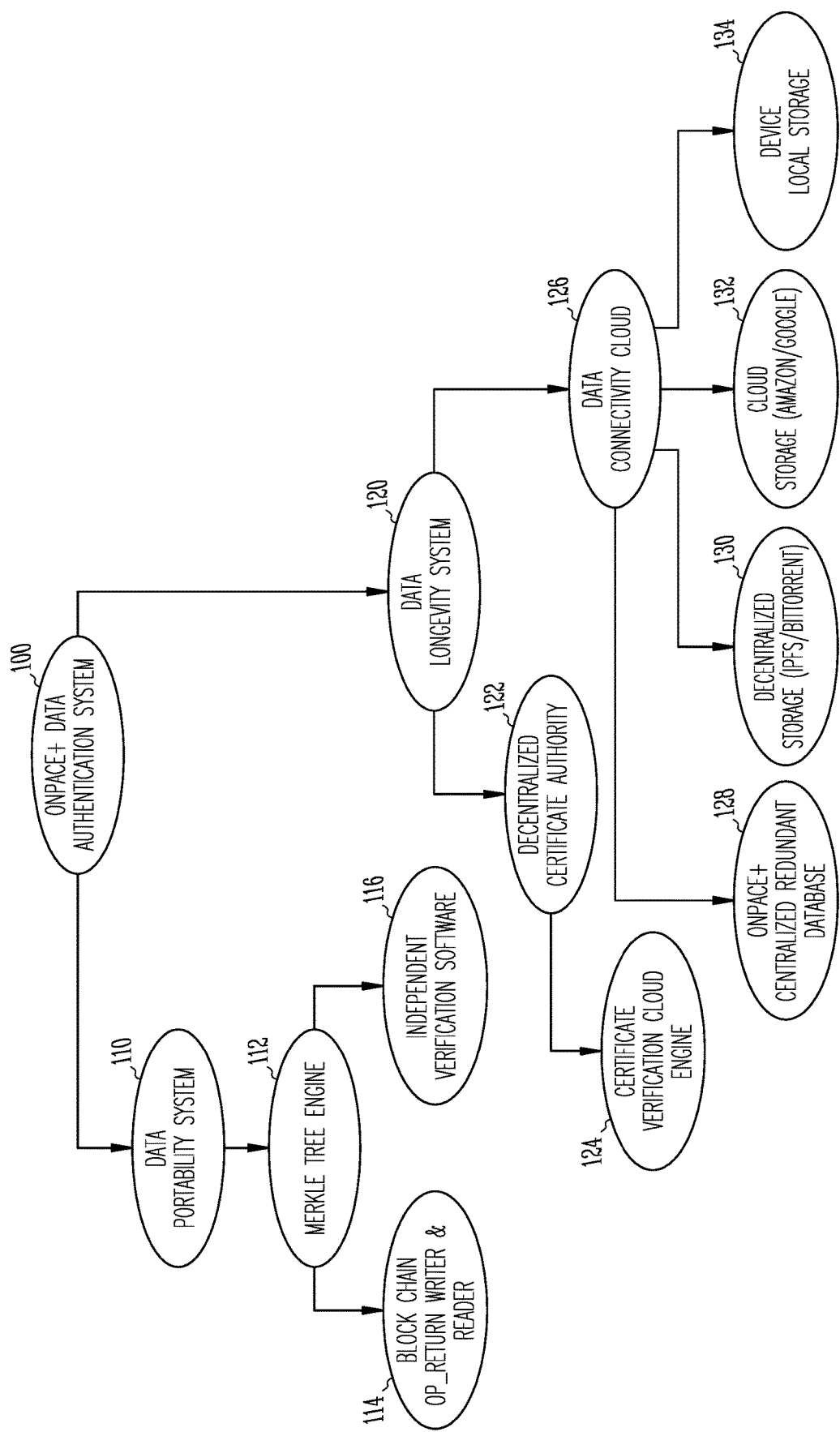
FIG. 1 illustrates a block diagram showing the integration of the features of a data portability system and data longevity system into a data authentication system in accordance with some embodiments.
Figure 2:
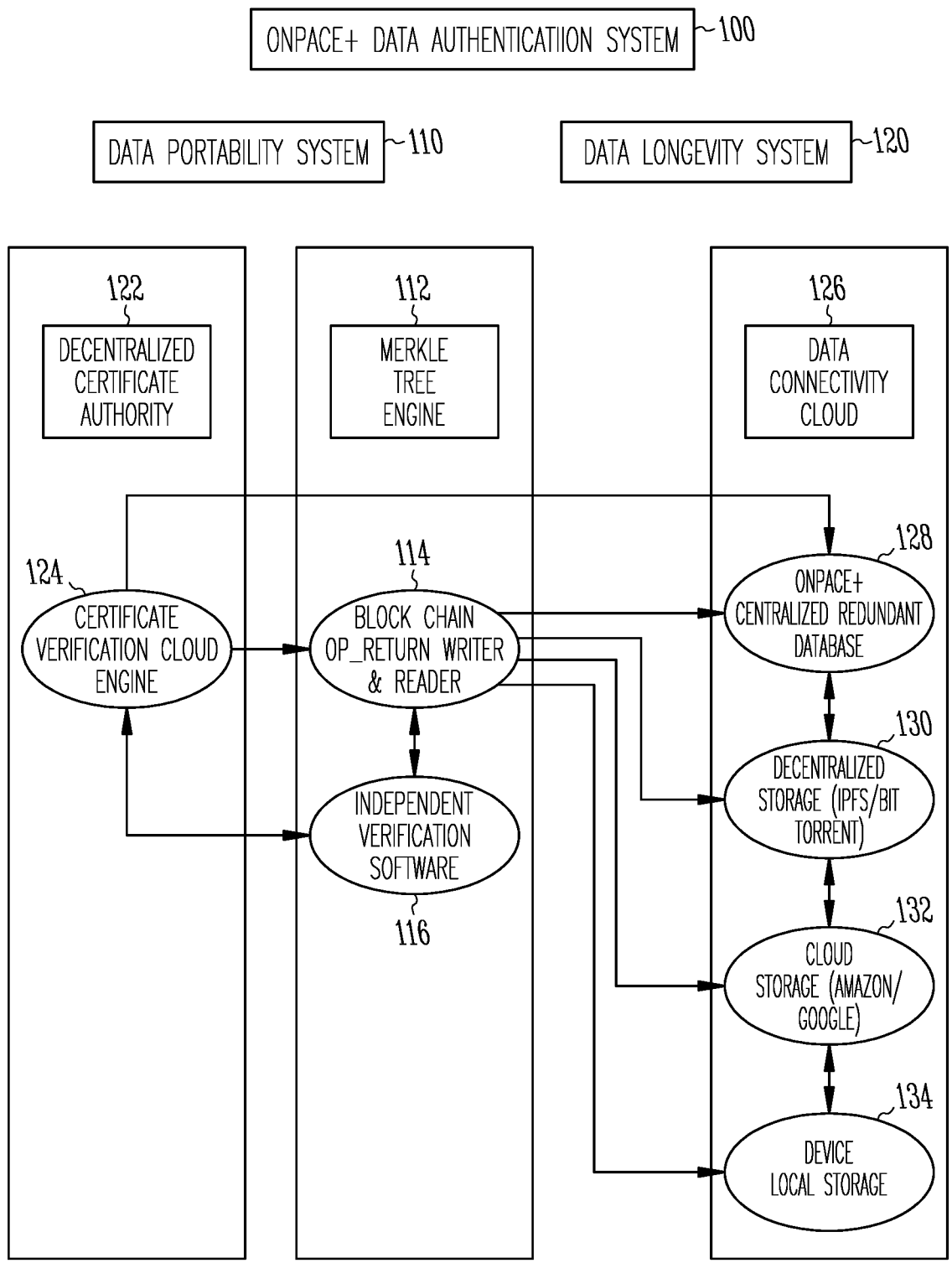
FIG. 2 illustrates the functional relationships of the elements in the embodiments of FIG. 1 in accordance with some embodiments.

FIG. 1 illustrates a block diagram showing the integration of the features of a data portability system and data longevity system into a data authentication system in accordance with some embodiments. As illustrated, the data authentication system 100 includes data portability system 110 and data longevity system 120. Data portability system 110 further includes a Merkle tree engine 112 that includes a blockchain OP_RETURN writer and reader 114 and independent verification software 116. On the other hand, data longevity system 120 includes a decentralized certificate authority 122 that further includes a certificate verification cloud engine 124. The data longevity system 120 also includes a data connectivity cloud 126 that implements a number of storage features including a centralized redundant database 128, a decentralized storage device 130, cloud storage 132, and device local storage 134. The decentralized storage device 130 and cloud storage 132 may be provided by any of a number of conventional storage services such as those provided by IPFS, BitTorrent, Amazon Cloud Services, and Google, for example. FIG. 2 illustrates the functional relationships of the elements in the embodiments of FIG. 1 in accordance with some embodiments. The function and operation of these elements will be described in more detail below.

In some embodiments, the system described herein makes use of pre-existing open-source tools such as hashing algorithms (e.g., SHA256, SHA-3), digital signature algorithms (e.g., ECDSA, RSA), and Bitcoin stack, including blockchain, Merkle trees, p2p networking, and the like. However, the data authentication system 100 in exemplary embodiments goes a step further and uses a data longevity protocol in data longevity system 120 combined with a decentralized certificate authority 122 to create a portable data integrity system. Each component of the system adds an additional layer of redundancy which solves the critical problem of data longevity. The open source technology helps to verify the source of the data as well as its integrity over a long period of time.

In some embodiments, hashing algorithms alone are not enough to verify the overall integrity of data within the system. Data relationships, timestamps, and ownership are all critical pieces of information relating to medical records. Hashing algorithms provide an excellent method of tamper-proofing data, but alone a hash digest is not enough to verify the legitimacy of a record in the context of a medical system.

Digital signature algorithms are widely used within technology and information systems software. The data authentication system 100 described herein makes use of these algorithms within the decentralized certificate authority 122. Digital signatures combined with blockchain verification and a certificate verification cloud engine 124 provide users with the ability to verify records using the service described herein as well as to independently verify on-the-fly.

The data authentication system 100 also leverages Bitcoin and blockchain technology as well as the underlying Merkle tree data structure. In addition to the blockchain's Merkle tree, the data authentication system 100 incorporates its own Merkle tree data structure within the Merkle tree engine 112. The Merkle tree engine also incorporates a Merkle branch verification tool loaded onto each user's device. This Merkle branch verification tool extends the functionality of a Merkle tree by incorporating signatures and hash digest proofs from the decentralized certificate authority 122 as well as the Merkle tree engine 112.

The Merkle tree engine 112 in some embodiments, in addition to device local storage 134, adds data to the following components:
  Major cloud computing data centers 132;
  Blockchain-based storage 130; and
  Centralized redundant storage 128.

Figure 3:
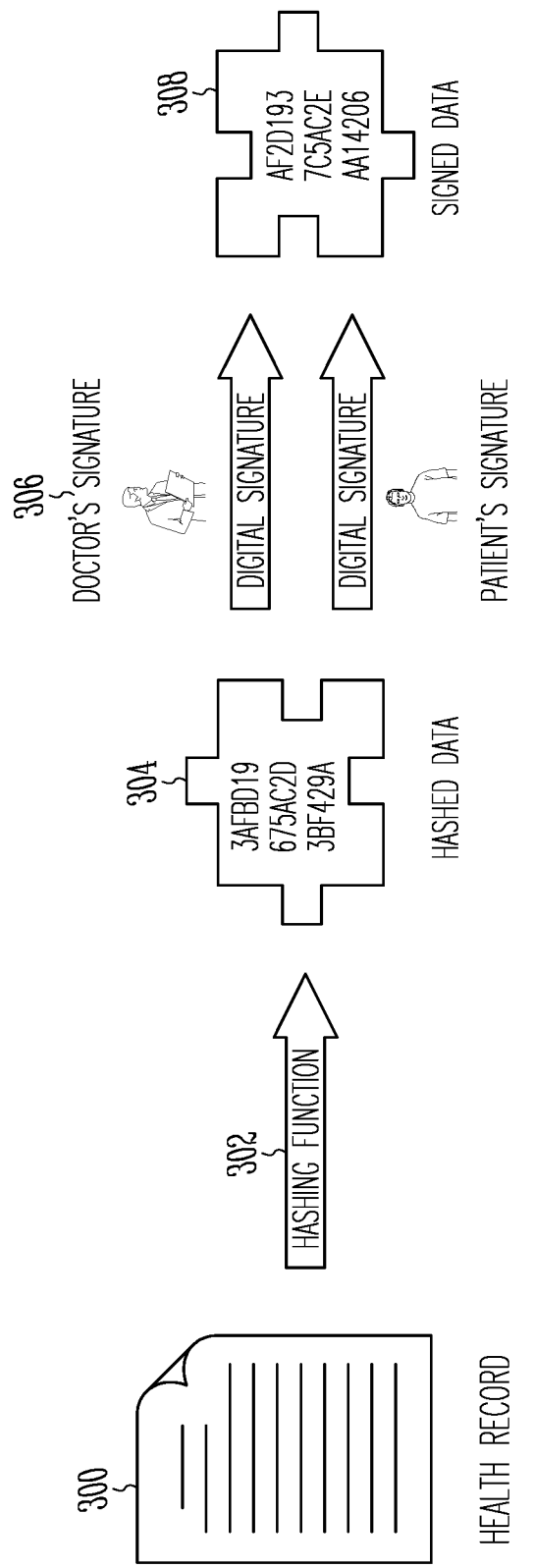
FIG. 3 illustrates how data coming into the system is salted using a secure random number and hashed using a hashing algorithm in accordance with some embodiments.
Figure 4:
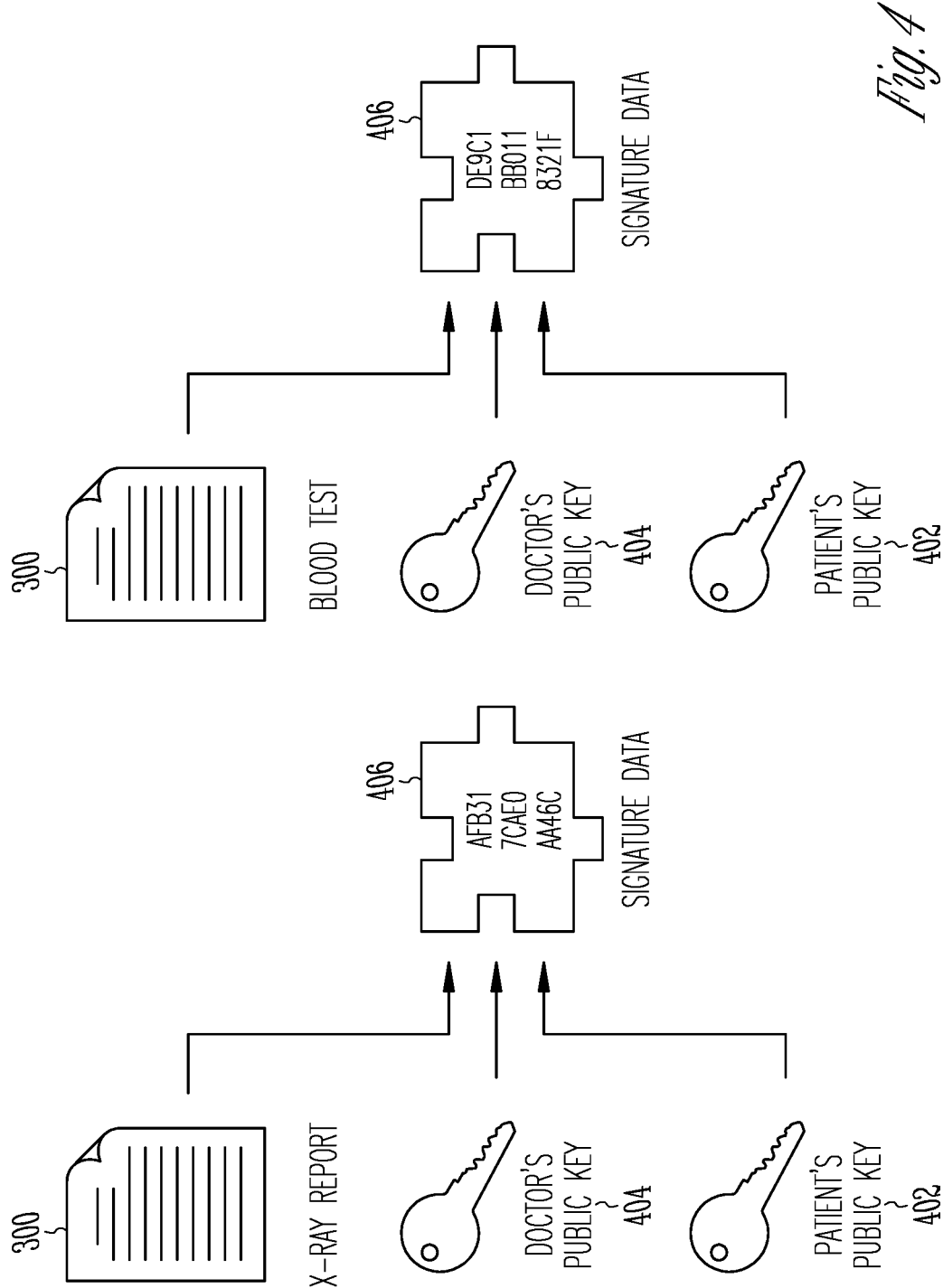
FIG. 4 illustrates how the data and hashed data generated in FIG. 3 is signed with a key assigned to each system user to enable privacy to be maintained in accordance with some embodiments.
Figure 5:
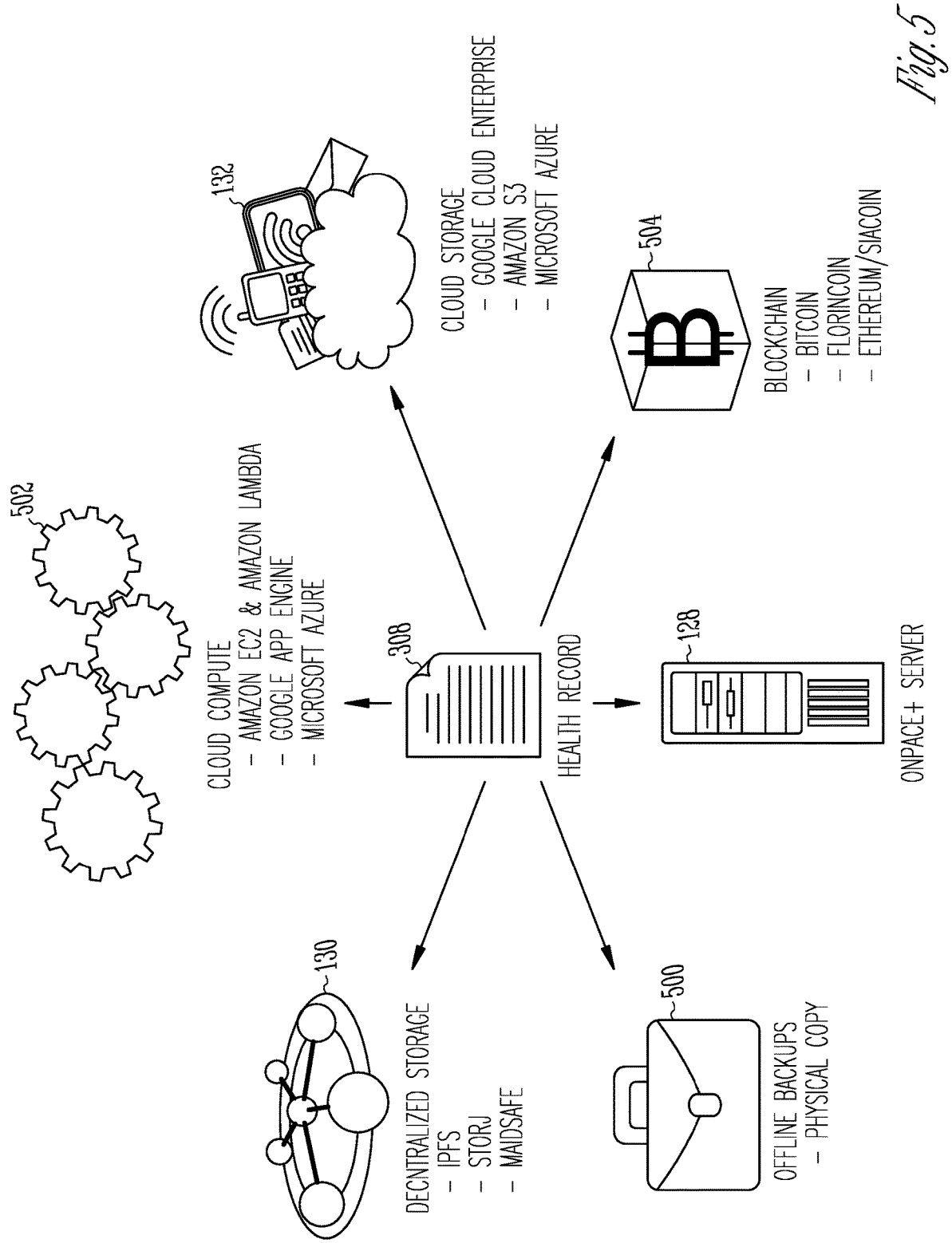
FIG. 5 illustrates a system for storing signature data that is encrypted and stored securely in decentralized storage, in the cloud, and in a redundant storage facility in accordance with some embodiments.
Figure 6:
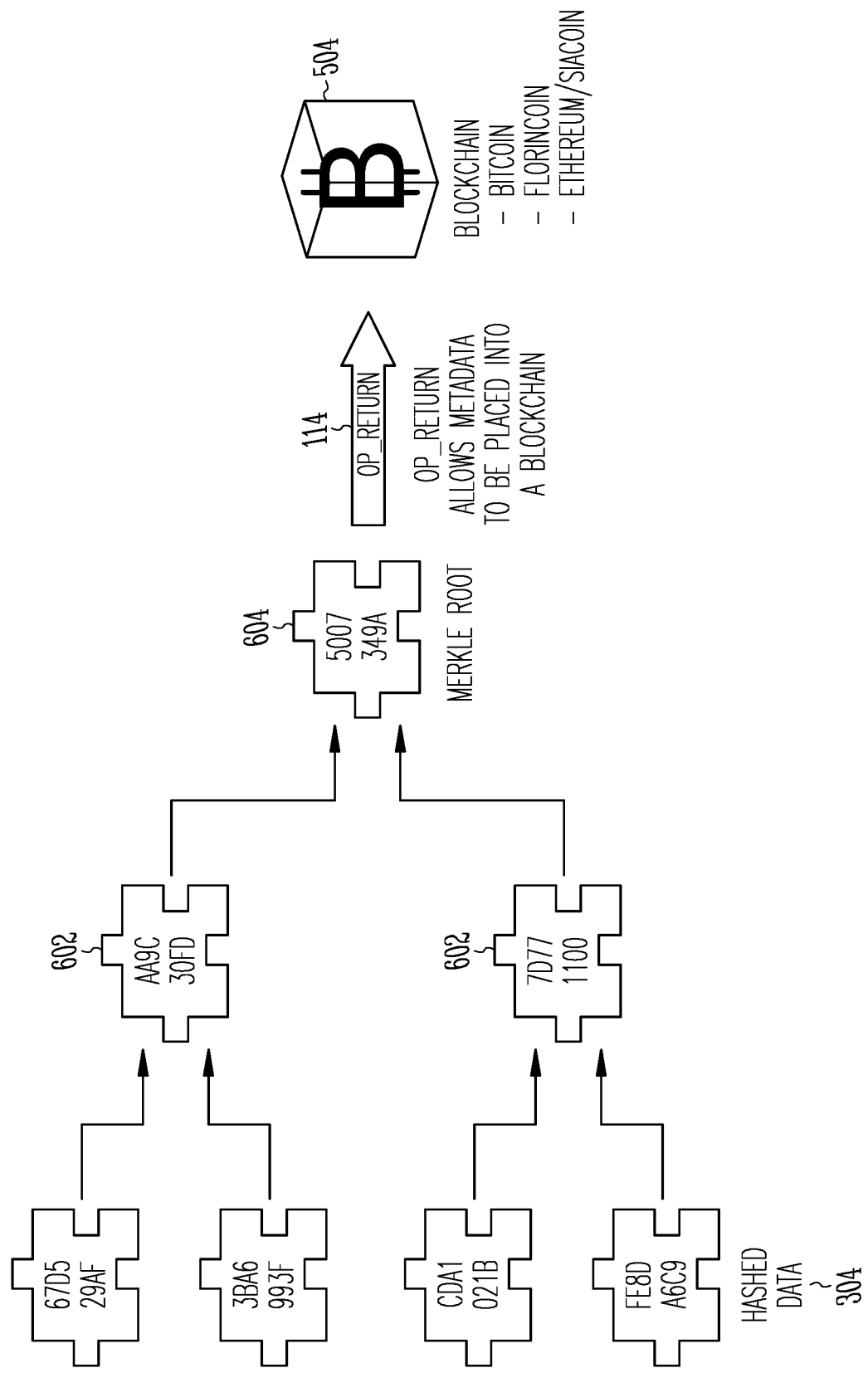
FIG. 6 illustrates techniques for using a blockchain to confirm a transaction containing OP_RETURN data generated in accordance with some embodiments.

In some embodiments, the Merkle tree engine 112 adds data to these data storage components using the following steps:
1. As illustrated in FIG. 3, data (e.g., health record) 300 coming into the system is salted using a secure random number and hashed using a hashing function 302 such as SHA256 to create hashed data 304. The data 300 can be any new data, including new messages, new communications, and new medical records as illustrated in FIG. 3.
2. The hashed data is then signed with the ECDSA key assigned to each user at 306 to form signed data 308. External users sign only the hash of the data, while primary users sign the entire data as well as the hash. As illustrated in FIG. 4, the patient's public key 402 and the doctor's public key 404 along with the data 300 may be used to extract the signature data 406 from the signed data 308; however, privacy is maintained because the hashing function 302 cannot be reversed.
3. As illustrated in FIG. 5, the signed data 308 is encrypted and stored securely in decentralized storage 130, in the cloud storage 132 as well as in a centralized redundant storage facility 128. Offline backups 500 further provide storage for a physical copy of the health record 300.
4. The signed data 308 is further hashed and stored into a Merkle tree by cloud computing resources 502, which again is encrypted and stored in the cloud storage 132 and in the redundant storage facility 128.
5. The Merkle root is generated and stored in the blockchain using the OP_RETURN opcode within Bitcoin, Florincoin, Ethereum, or any other metadata-layer. OP_RETURN allows data storage in the blockchain 504. The blockchain 504 is usually reserved only for financial transactions; however, using OP_RETURN, any metadata can be added into a blockchain.
6. As illustrated in FIG. 6, the blockchain 504 confirms a transaction containing OP_RETURN data generated by OP_RETURN writer and reader 114 and a centralized server of the centralized redundant database 128 records timestamp information as well as transaction and block hash 602 from the Merkle root 604 in the centralized redundant database 128.
7. The OP_RETURN data as well as other relevant information is broadcasted to each user and each node in the network. Relevant parties are informed by the centralized server of the centralized database 128 that the decentralized OP_RETURN data is validated on-chain.

The end result is that the blockchain information is stored within the cloud and in the centralized redundant database 128, and the blockchain information is also redundant and decentralized within the network of devices and nodes having access to the data authentication system 100.

Data Portability

Medical records and all data are portable within the data authentication system 100. The digital signature of any record can be checked against the cloud computing server of centralized redundant database 128 at any time to verify its authenticity. Data can be taken offline (out of the cloud & out of the server) and re-introduced at a later time as long as the signature is kept intact as well.

For example, in some embodiments, the data authentication system 100 takes a health record, signed data, and a public key as input from a user. The data authentication system 100 computes the validity of the signature and returns a verification response after checking the signature using the appropriate algorithm. The decentralized certificate authority 122 within the data authentication system 100 checks the signature validity against the known key for each user and allows data importing based on this validity check.

Data Connectivity System

Figure 7:
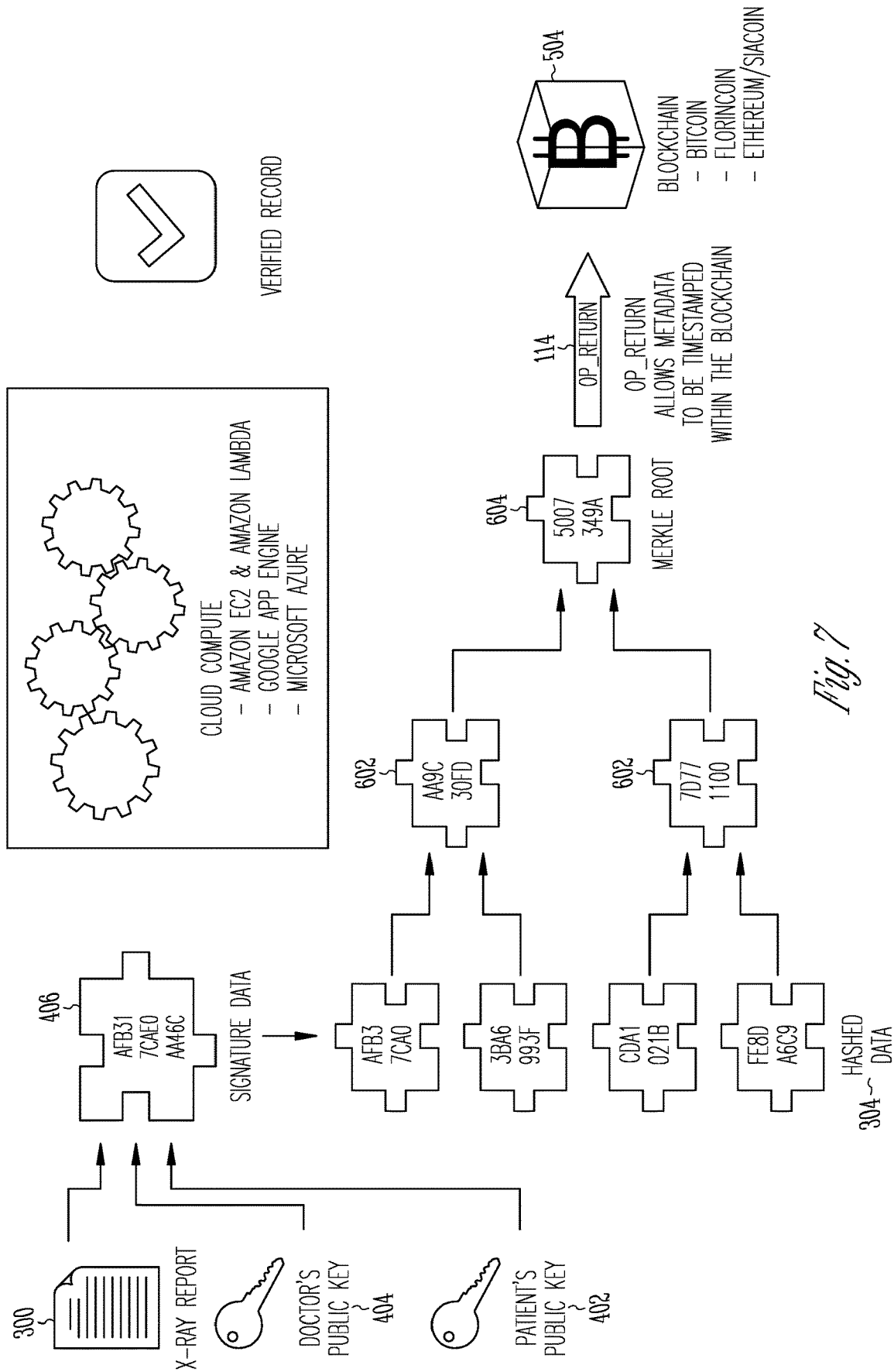
FIG. 7 illustrates the compression of digital signatures for all data within the system into Merkle trees that are uploaded to a cloud server and the Merkle root is stored in the blockchain in accordance with some embodiments.
Figure 8:
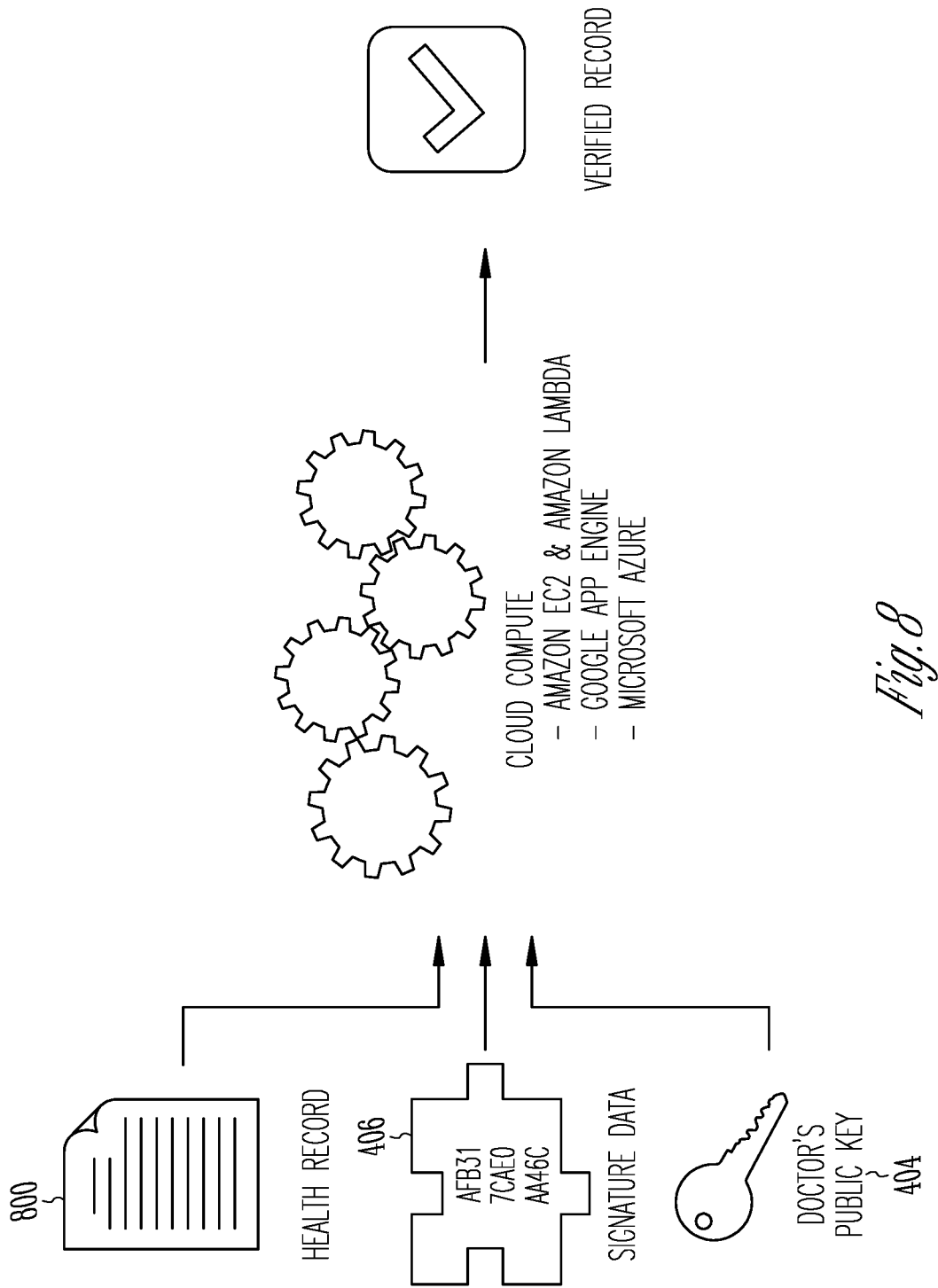
FIG. 8 illustrates how doctors and patients may verify the authenticity of their documents within their lifetime health record in accordance with some embodiments.

As shown in FIG. 7, in some embodiments, doctors' and patients' keys 402, 404 are used to verify ongoing claims and messages within the data authentication system 100. This is achieved using fundamental cryptographic components including digital signatures, a decentralized certificate authority 122, and cloud computing endpoints. In operation, digital signatures for all data within the data authentication system 100 are compressed into a Merkle tree 602 and uploaded to the cloud server of the cloud storage 132 and, at the same time, the Merkle root 604 is stored in the blockchain 504. As illustrated in FIG. 7, the Merkle root 604 is given a timestamp within the blockchain 504 using OP_RETURN, which allows metadata to be timestamped within the blockchain 504. This process validates the Merkle root's authenticity for a period of time. Doctors and patients then verify the authenticity of their documents within their lifetime health record using this system as shown in FIG. 8. As illustrated, the signed data 406, the doctor's public key 404, and the patient's lifetime health record 800 are analyzed by verification software in the certificate verification cloud engine 124 to generate a verified record.

Each document signed and verified by multiple parties validates its authenticity in the data authentication system 100. As time goes on, the lifetime medical record of each patient becomes more intertwined with the data authentication system 100 as their signature is used to verify more data. Connectivity of data relies upon users taking action within the data authentication system 100. The decentralized certificate authority 122 provides data portability and assures verified timestamps of all data using this methodology.

Independent Verification of Merkle Tree Data

Patients and doctors both have a copy of the Merkle branch for records they own. Using the Merkle branch, the patient and the doctor are able to independently verify their record matches the Merkle root in the blockchain by using the certificate verification cloud engine software 124. The certificate verification cloud engine 124 software takes the Merkle branch, the users' health record data, and the users' keys as input and generates a response: valid or invalid, depending on whether or not the verification tests pass using hash checksums (e.g., SHA256) as well as digital signature algorithms. The digital signature algorithm chosen depends on the key type and certificate authority requirements. The client can check this response against their own open-source software to validate its authenticity. The Merkle root 604 is timestamped in the blockchain 504 to prove that the record existed before a certain point in time. The Merkle branch 602 only contains data relevant to the single health record 300 in question. Leaf nodes in the Merkle tree are not included because of privacy and scalability reasons.

Data Longevity System

The data authentication system 100 mitigates data longevity issues by implementing a regional as well as a service-level redundant storage system. Specifically, the data authentication system 100 retains data in an in-house centralized redundant database 128 in a data center as well as in blockchain-based and cloud-based data storage platforms, using multiple blockchains to store the full data index. The following technologies are leveraged to provide this level of fault tolerance:

Decentralized Storage 130 (e.g., IPFS, Storj, Maidsafe, BitTorrent)
Cloud Storage 132 (e.g., Google Cloud, Amazon S3, Microsoft Azure)
Users' Device Storage 134 (data saved on-device)
Offline Backups 500 (physical copies)
Centralized Redundant Storage 128
Blockchain 504 (e.g., Bitcoin, Florincoin, Ethereum)

Merkle Roots that cover every record are placed in the blockchain 504 using the OP_RETURN metadata field 114. All data is encrypted at rest within the centralized redundant storage data center and on the cloud. Doctors have access to the data via unique symmetric keys that ensure confidentiality. Authorization is handled on a granular basis. Doctors are given the authority to decrypt records implicitly via access to individual keys.

Figure 9:
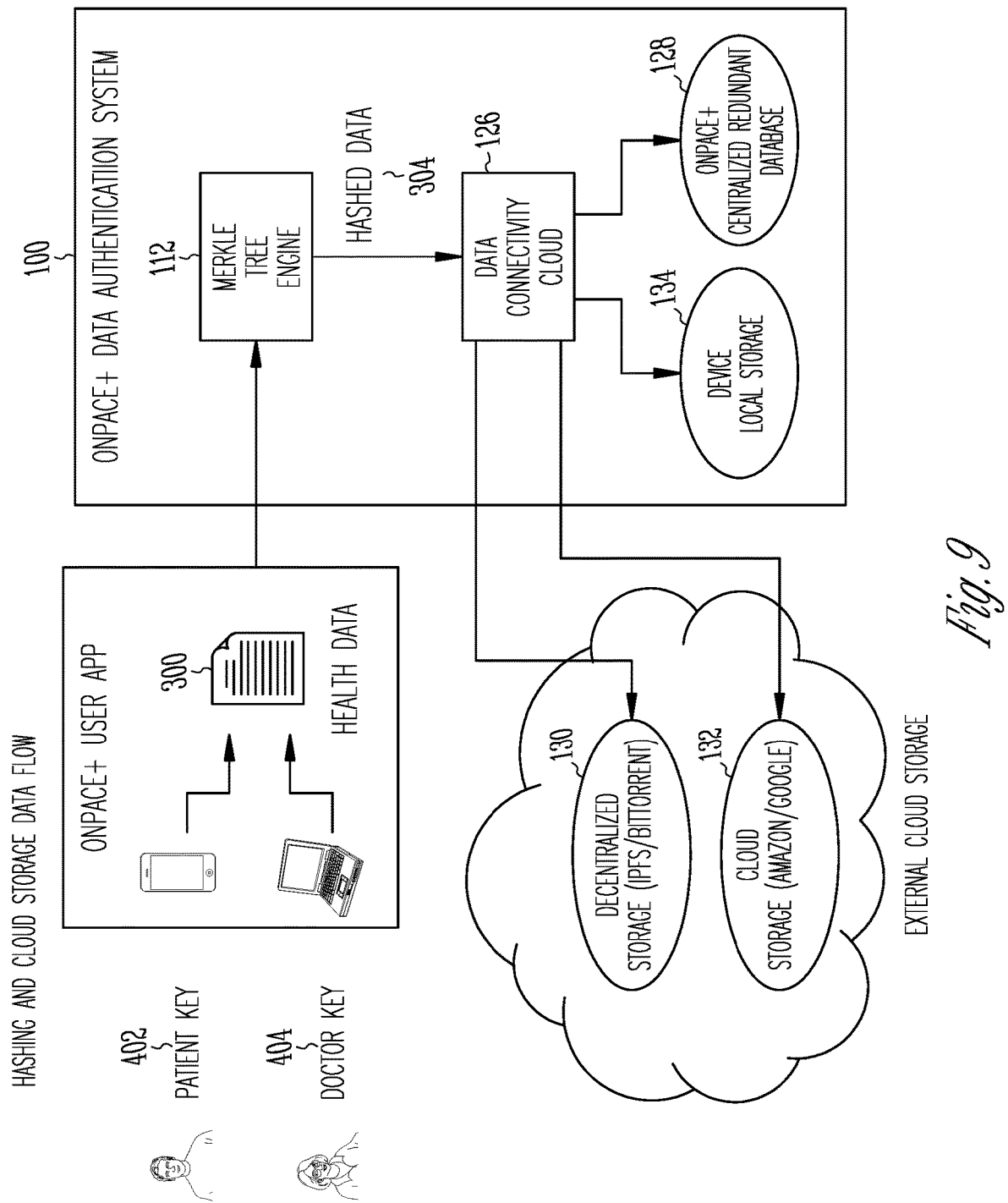
FIG. 9 illustrates a high-level overview of user data and how it enters the system in accordance with some embodiments.

FIG. 9 illustrates a high-level overview of user data and how it enters the system and is hashed and stored in accordance with some embodiments. For example, a patient goes to the doctor's office and both the patient and the doctor use their keys 402, 404 to sign health data 300 as illustrated. Then, the health data enters the data authentication system 100 and gets hashed by the Merkle tree engine 112 and sent to the blockchain 504 in the Merkle tree engine 112. The data is then sent to the cloud through the data connectivity cloud 126 as described above.

Figure 10:
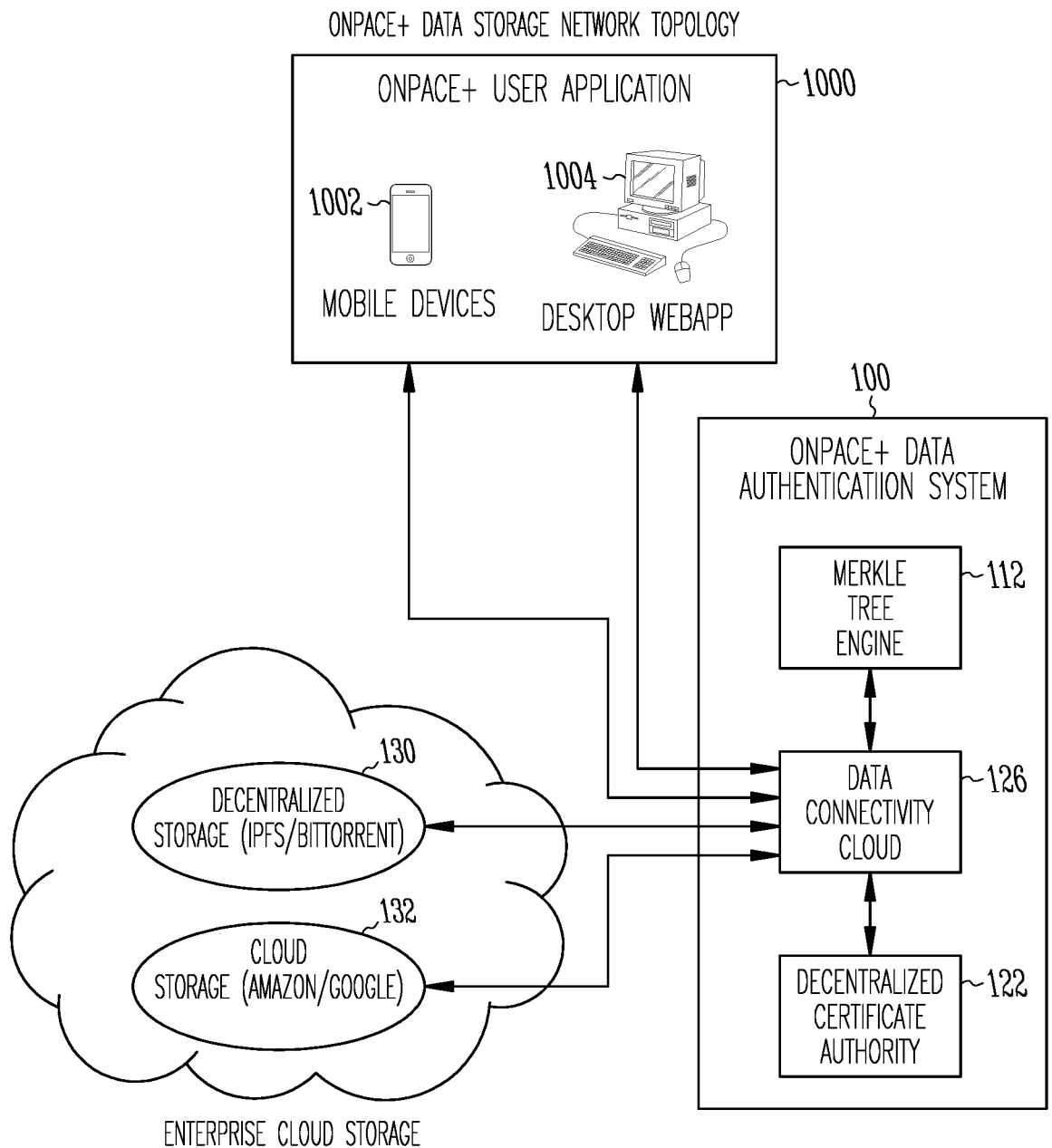
FIG. 10 illustrates how the data storage network is laid out in accordance with some embodiments.

FIG. 10 illustrates how the data storage network is laid out in accordance with some embodiments. FIG. 10 illustrates only the way data storage is handled—not the way other messages and data flow through the data authentication system 100. As illustrated in FIG. 10, the user application 1000 is implemented on mobile devices 1002 and/or desktop web apps 1004 and connects the user devices with the data connectivity cloud 126 directly to store patient data such as health records 300, including X-rays, images, audio, etc. The data connectivity cloud 126 connects with the other parts of the data authentication system 100 including the Merkle tree engine 112 and the decentralized certificate authority 122 internally. At the same time, the data connectivity cloud sends data out to the enterprise cloud storage system 132 to ensure that redundant backups are maintained.

Figure 11:
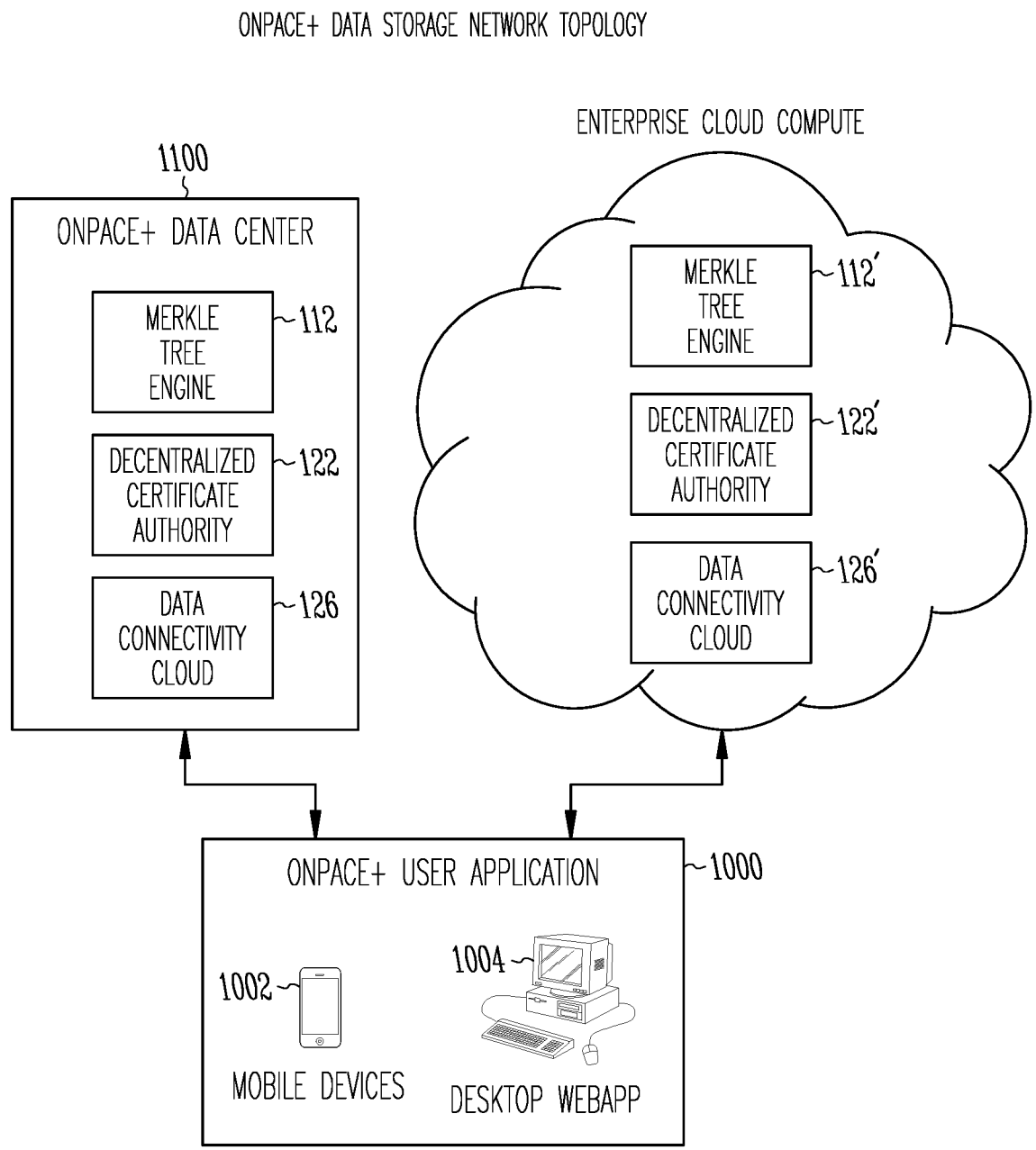
FIG. 11 illustrates how the computing network works in accordance with some embodiments.

FIG. 11 illustrates how the computing network works in accordance with some embodiments. For example, if a user needs to check the decentralized certificate authority 122 to determine if their electronic medical record (EMR) is authentic, the user would connect to either an endpoint running in the enterprise cloud server of the cloud computing system 502, or the user would connect to an endpoint of the data center 1100 as illustrated. These nodes in the network are running the same software (i.e., 112=112', 122=122', and 126=126') and accessing the same blockchain 504 to ensure that the data integrity remains high.

Those skilled in the art will appreciate that the data authentication system 100 is implemented using appropriate computing resources (e.g., one or more processors) and memory resources that store software including instructions for implementing the methods and algorithms described herein. Memory for storing instructions for implementing the systems and methods described herein include Random Access Memory (RAM), and semiconductor memory devices, which may include, in some embodiments, storage locations in semiconductors such as registers. Specific examples of static memory include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks, magneto-optical disks; RAM; and CD-ROM and DVD-ROM disks.

One or more machines implementing the data authentication system 100 described herein may further include a display device, an input device (e.g., a keyboard), and a user interface (UI) navigation device (e.g., a mouse). In an example, the display device, input device, and UI navigation device may be a touch screen display. The one or more machines may additionally include a mass storage (e.g., drive unit), a signal generation device (e.g., a speaker), a network interface device, and one or more sensors for collecting data, such as patient data. The one or more machines may include an output controller, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.). In some embodiments, the processor and/or instructions may comprise processing circuitry and/or transceiver circuitry.

In sample embodiments, the storage device may include a machine-readable medium on which is stored one or more sets of data structures or instructions (e.g., software) embodying or utilized by any one or more of the techniques or functions described herein. The instructions may also reside, completely or at least partially, within the main memory, within static memory, or within the hardware processor during execution thereof by the machine. In an example, one or any combination of the hardware processor, the main memory, the static memory, or the storage device may constitute machine readable media. Specific examples of machine readable media may include: non-volatile memory, such as semiconductor memory devices (e.g., EPROM or EEPROM) and flash memory devices; magnetic disks, such as internal hard disks and removable disks; magneto-optical disks: RAM; and CD-ROM and DVD-ROM disks.

While the machine-readable medium is generally a single medium, the term "machine readable medium" may include a single medium or multiple media (e.g., a centralized or distributed database, and/or associated caches and servers) configured to store the one or more instructions.

An apparatus of the machine(s) implementing the data authentication system 100 may be one or more of a hardware processor (e.g., a central processing unit (CPU), a graphics processing unit (GPU), a hardware processor core, or any combination thereof), a main memory, and a static memory, sensors, network interface device, antennas, a display device, an input device, a UI navigation device, a mass storage, instructions, a signal generation device, and an output controller. The apparatus may be configured to perform one or more of the methods and/or operations disclosed herein. The apparatus may be intended as a component of the machine to perform one or more of the methods and/or operations disclosed herein, and/or to perform a portion of one or more of the methods and/or operations disclosed herein. In some embodiments, the apparatus may include a pin or other means to receive power. In some embodiments, the apparatus may include power conditioning hardware.

The term "machine readable medium" may include any medium that is capable of storing, encoding, or carrying instructions for execution by one or more machines and that cause the one or more machines to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine-readable media. As used herein, "machine readable media" excludes a transitory propagating signal.

The instructions may further be transmitted or received over a communications network using a transmission medium via a network interface device utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others.

In an example, a network interface device may include one or more physical jacks (e.g., Ethernet, coaxial, or phone jacks) or one or more antennas to connect to a communications network. In an example, a network interface device may include one or more antennas to wirelessly communicate using at least one of single-input multiple-output (SIMO), multiple-input multiple-output (MIMO), or multiple-input single-output (MISO) techniques. In some examples, the network interface device may wirelessly communicate using Multiple User MIMO techniques. The term "transmission medium" shall be taken to include any intangible medium that is capable of storing, encoding or carrying instructions for execution by the machine, and includes digital or analog communications signals or other intangible medium to facilitate communication of such software.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Some embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; flash memory, etc.

The systems and methods described herein are captured within the scope of the following claims. It is understood by those skilled in the art that the claims encompass specific embodiments as well as embodiments that are not specifically described herein but which may include equivalent components and steps to those described herein as well as other features and modifications that would be apparent to those skilled in the art.

What is claimed is:

1. A decentralized data authentication system comprising:
    decentralized data storage;
    a memory comprising instructions; and
    one or more processors in communication with the memory, the one or more processors executing the instructions to implement a blockchain comprising a Merkle tree and:
    a decentralized certificate authority including a certificate verification engine that takes a Merkle branch, record data, and users' keys as input and generates a hash of the record data, signs the hashed data using the users' keys to form signature data, and provides a validity response for the record data;
    a Merkle tree engine including a blockchain OP_RETURN writer/reader that hashes the signature data and stores the hashed signature data in the Merkle tree of the blockchain and stores a Merkle root in the blockchain using an OP_RETURN opcode; and
    a data connectivity cloud that encrypts and stores the signature data and Merkle tree created from the record data redundantly in the decentralized data storage,
    wherein the Merkle tree engine comprises a hashing algorithm that receives input data, hashes the input data to create hashed data, signs the hashed data with a key assigned to a user to form signed hashed data, encrypts the signed hashed data, and stores the encrypted signed hashed data in the data connectivity cloud.

2. The system of claim 1, wherein the decentralized certificate authority accepts record data, signature data, and a user's public key as input, computes the validity of a signature of the signature data, and returns the validity response indicating whether the record data may be imported into the system and stored in the decentralized data storage.

3. The system of claim 1, wherein the blockchain timestamps the hashed signature data stored to the Merkle tree and the Merkle root and timestamps the Merkle root using the OP_RETURN opcode to generate timestamp data, and the timestamp data and a transaction and block hash from the Merkle root are stored in the data connectivity cloud.

4. The system of claim 1, wherein the Merkle tree engine includes independent verification software that verifies that a user's Merkle branch for the user's records matches the Merkle root in the blockchain.

5. The system of claim 4, wherein the independent verification software receives the user's Merkle branch, the user's record data, and the user's public key as input and generates a validity response indicating whether or not a verification test is passed using hash checksums and digital signature algorithms.

6. The system of claim 1, wherein the blockchain comprises a lifetime health record of health data of a patient that is accessed and updated using the patient's public key and a physician's public key.

7. The system of claim 1, wherein the decentralized certificate authority enables users to sign and later verify authenticity of a record that has been offline by checking a digital signature of the record against the record data stored in the decentralized data storage.

8. The system of claim 1, wherein the data connectivity cloud comprises a centralized redundant database, the decentralized data storage, cloud storage, and storage local to a user processing device.

9. The system of claim 1, wherein the Merkle tree engine further hashes the signed hashed data and stores the hashed signed hashed data into a Merkle tree of the Merkle tree engine.

10. The system of claim 9, wherein the Merkle tree engine further encrypts the hashed signed hashed data and stores the encrypted hashed signed hashed data in the data connectivity cloud.

11. The system of claim 1, wherein the Merkle tree engine broadcasts OP_RETURN validation data to user processing devices.

12. The system of claim 1, wherein the Merkle tree engine compresses the signature data into a Merkle tree and uploads the Merkle tree of signature data to the data connectivity cloud.

13. The system of claim 1, wherein the certificate verification engine takes the Merkle branch, a user's health record data, and a user's key as input and generates a response indicating whether the user's health record data matches the Merkle root in the blockchain.

14. A decentralized data authentication system comprising:
    decentralized data storage;
    a memory comprising instructions; and
    one or more processors in communication with the memory, the one or more processors executing the instructions to implement a. blockchain comprising a Merkle tree and:
    a decentralized certificate authority that accepts record data, signature data, and a user's public key as input, computes the validity of a signature of the signature data, and returns a validity response indicating whether the record data may be imported into the system and stored in the decentralized data storage, the decentralized certificate authority including a certificate verification engine that takes a Merkle branch, the record data, and users' keys as input and generates a hash of the record data, signs the hashed data using the users' keys to form signature data, and provides the validity response for the record data;
    a Merkle tree engine including a blockchain OP_RETURN writer/reader that hashes the signature data and stores the hashed signature data in the Merkle tree of the blockchain and stores a Merkle root in the blockchain using an OP_RETURN opcode; and
    a data connectivity cloud that encrypts and stores the signature data and Merkle tree created from the record data redundantly in the decentralized data storage,
    wherein the blockchain timestamps the hashed signature data stored to the Merkle tree and the Merkle root and timestamps the Merkle root using the OP_RETURN opcode to generate timestamp data, and the timestamp data and a transaction and block hash from the Merkle root are stored in the data connectivity cloud.

15. The system of claim 14, wherein the Merkle tree engine includes independent verification software that verifies that a user's Merkle branch for the user's records matches the Merkle root in the blockchain.

16. The system of claim 15, wherein the independent verification software receives the user's Merkle branch, the user's record data, and the user's public key as input and generates a validity response indicating whether or not a verification test is passed using hash checksums and digital signature algorithms.

17. A decentralized data authentication system comprising:

decentralized data storage;

a memory comprising instructions; and one or more processors in communication with the memory, the one or more processors executing the instructions to implement a blockchain comprising a lifetime health record of health data of a patient that is accessed and updated using the patient's public key and a physician's public key, the blockchain comprising a Merkle tree and:

a decentralized certificate authority including a certificate verification engine that takes a Merkle branch, a user's health record data, and a user's key as input and generates a hash of the record data, signs the hashed data using the users' keys to form signature data, and provides a response indicating whether the user's health record data matches the Merkle root in the blockchain;

a Merkle tree engine including a blockchain OP_RETURN writer/reader that hashes the signature data and stores the hashed signature data in the Merkle tree of the blockchain and stores a Merkle root in the blockchain using an OP_RETURN opcode; and a data connectivity cloud that encrypts and stores the signature data and Merkle tree created from the record data redundantly in the decentralized data storage.

18. The system of claim 17, wherein the decentralized certificate authority enables users to sign and later verify authenticity of a record that has been offline by checking a digital signature of the record against the record data stored in the decentralized data storage.

19. The system of claim 17, wherein the Merkle tree engine compresses the signature data into a Merkle tree and uploads the Merkle tree of signature data to the data connectivity cloud.

* * * * *